United States Patent [19]

Morrison

[11] Patent Number: 4,468,910
[45] Date of Patent: Sep. 4, 1984

[54] MAT MODULE WITH RAMP STRIP

[76] Inventor: Richard A. Morrison, 3 Morgan Rd., Baie d'Urfé, Quebec, Canada, H9X 3A3

[21] Appl. No.: 478,142

[22] Filed: Mar. 23, 1983

[51] Int. Cl.³ .............................. E04C 1/10; B32B 3/10
[52] U.S. Cl. ........................................ 52/591; 52/177; 52/594; 428/45; 428/57; 428/60; 428/131; 428/134; 428/192; 404/36; 404/39; 404/41
[58] Field of Search ....................... 428/44, 45, 60, 57, 428/134, 131, 192; 404/36, 39, 41; 52/177, 593, 591, 590, 594; 156/304.5

[56] References Cited

U.S. PATENT DOCUMENTS 3,802,144  4/1974  Spica ................................ 404/36 X
3,846,945  11/1974  Roby ................................ 404/36 X Primary Examiner—Alexander Thomas
Attorney, Agent, or Firm—Russell L. Johnson

[57] ABSTRACT

A floor mat assembly is disclosed which is molded from resilient plastic material, and made up of only two different elements, mat modules and ramp strips. The mat module comprises a rectangular shape with two adjoining edges, each of the edges having an upper coupling edge flap with a row of downward directed projections, and two other adjoining edges, each of the other edges having a lower coupling edge flap with a row of vertical holes to couple with a row of projections on an upper coupling edge flap of a ramp strip or an adjoining mat module. The ramp strip comprises a tapered face with an upper coupling edge flap adjacent the tapered face, and a lower coupling edge flap joined by a severable link to the upper coupling edge flap, the lower coupling edge flap of the ramp strip to couple with an upper coupling edge flap of a mat module, and when the link is severed, the upper coupling edge flap of the ramp strip to couple with a lower coupling edge flap of a mat module.

6 Claims, 7 Drawing Figures

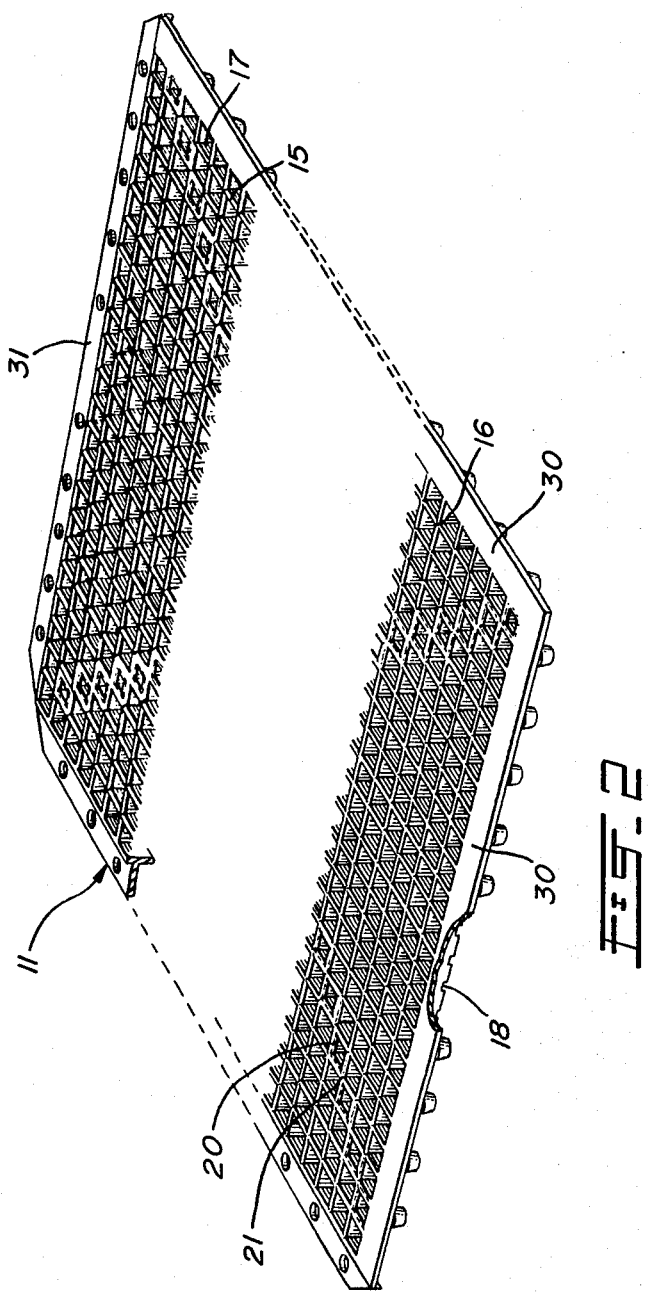

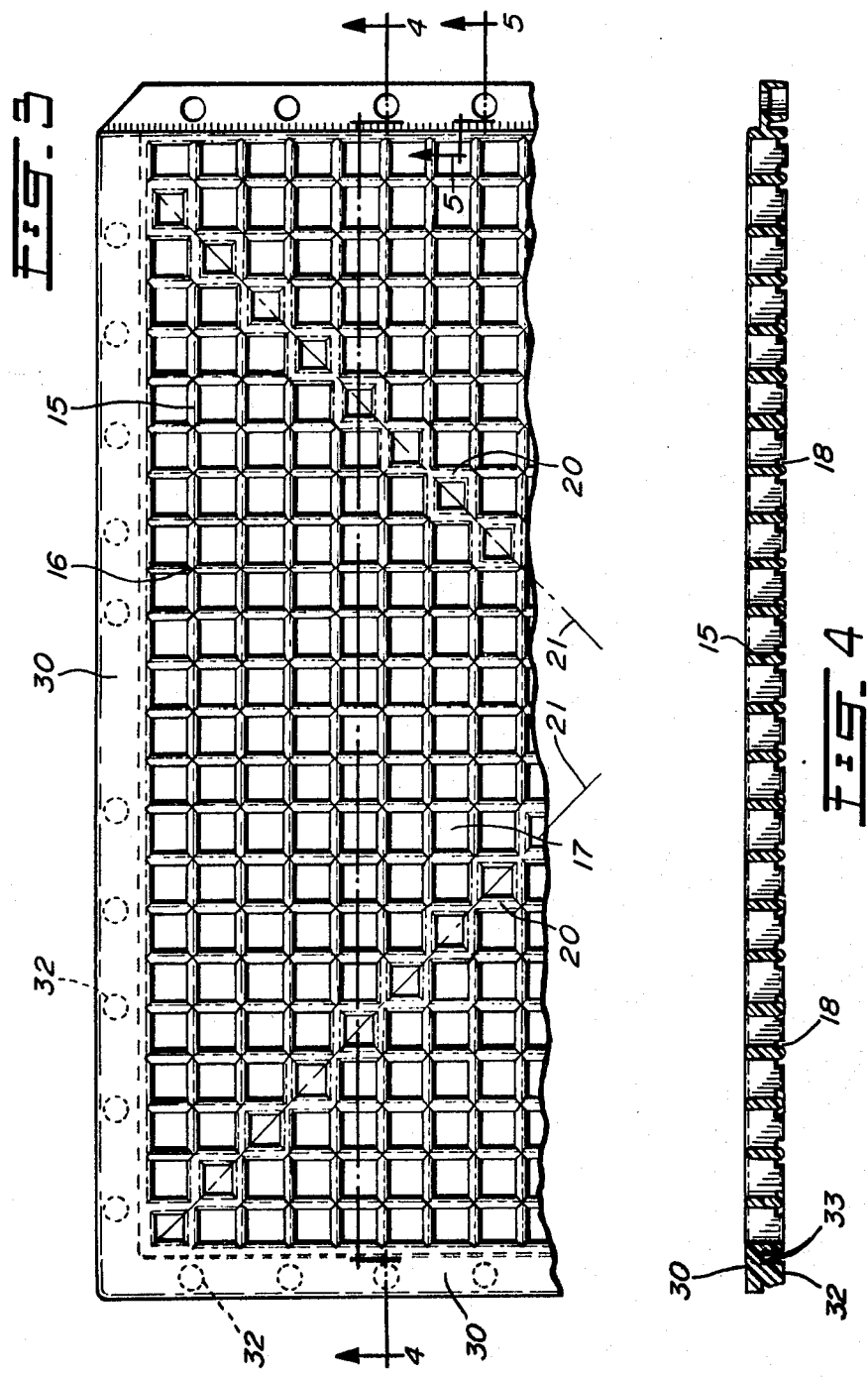

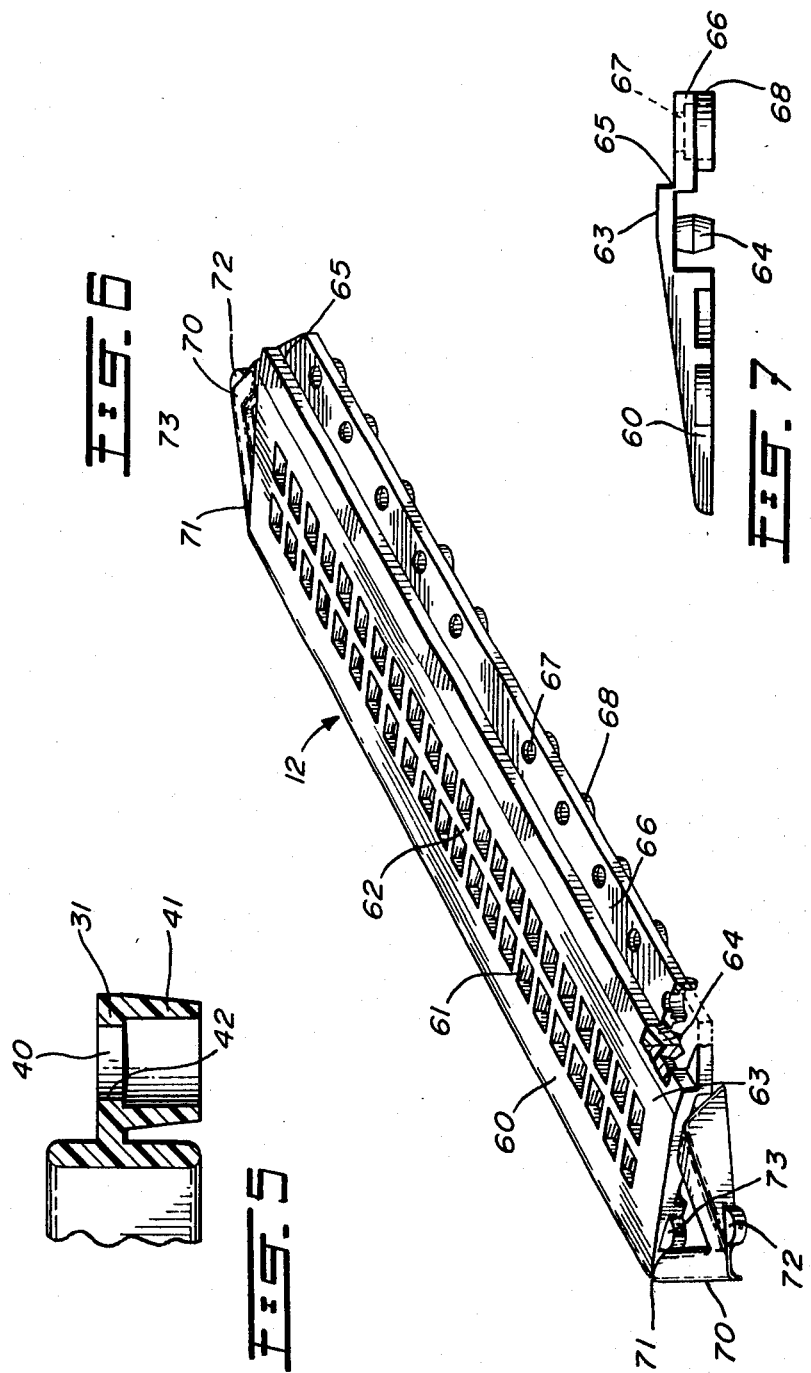

MAT MODULE WITH RAMP STRIP

The present invention relates to a modular floor mat system. More specifically, the present invention provides a floor mat assembly made up of mat modules coupled together and having ramp strips at the edge of the mat assembly.

Anti-skid floor mats are used in many locations, such as building entrances and lobbies, industrial work areas. Their purpose is primarily to prevent slipping where floors are wet or may be wet from time to time in such locations as swimming pools, hospitals, kitchens, restaurants, etc. Some mats used today are made to certain dimensions, such as rectangular, others are made of modules and joined together to form a mat assembly to fit a particular floor area. In many locations it is necessary that anti-skid floor mats have sloped edges so the trolleys and carts can easily be wheeled over the mat and there are no trip zones for people walking onto the mat.

Some types of anti-skid mats do not provide drainage and allow fluid to collect on the mat, or in some cases on the floor surface under the mat. If the mat is to be used in areas where water or other liquids collect, then drainage is a necessity. Such examples would be shower rooms, around swimming pools, automobile floor mats, etc.

The present invention provides a floor mat assembly which is formed from two different components, mat modules and ramp strips. Any number of these two components may be joined together to form a desired mat assembly. By having only two different types of components, the necessity of storing many different components to make up a mat assembly is reduced to a minimum. Furthermore, the mold cost for producing the elements is kept to a minimum. The ramp strip has severable portions so that it can attach to any side of a mat module. The ramp strip also has triangular shape corner elements at each end which can be joined together at a corner of a mat module to form a ramp in that corner or, alternatively, can be cut off or severed from the ramp strip so ramp strips can be positioned side by side in a straight line. The mat modules in a preferred embodiment have a square grid pattern with holes therethrough and drainage gaps to allow liquid to drain from one module to another, thus allowing a drain to be located at a convenient location under the mat assembly.

The present invention provides a floor mat assembly molded from resilient plastic having in combination at least one mat module which can be coupled to a ramp strip and an adjoining mat module, the mat module comprising a rectantular shape with two adjoining edges, each of the edges having an upper coupling edge flap with a row of downward directed projections, and two other adjoining edges, each of the other edges having a lower coupling edge flap with a row of vertical holes to couple with a row of projections on an upper coupling edge flap of a ramp strip, or an adjoining mat module, the ramp strip comprising a tapered face with an upper coupling edge flap adjacent the tapered face and a lower coupling edge flap joined by a severable link to the upper coupling edge flap, the lower coupling edge flap of the ramp strip to couple with an upper coupling edge flap of a mat module, and when the link is severed the upper coupling edge flap of the ramp strip to couple with a lower coupling edge flap of a mat module.

In another embodiment of the invention, the ramp strip has a severable triangular shaped corner element at each end, the triangular shaped corner element being severed for ramp strips positioned side by side in a straight line and joining with a triangular shaped corner element of an adjoining ramp strip, positioned in a corner relationship such that a ramp is formed at a corner of the mat module. In a still further embodiment, the mat module has a grid pattern of intersecting members, the members intersecting at nodes forming holes through the mat module between the members, the nodes each having a space on the bottom surface of the modular mat to permit drainage. In a preferred embodiment the members intersect perpendicularly and the holes are square. The ramp strip may also have a grid pattern of intersecting members, with square holes therebetween, having substantially the same dimensions as those in the mat member.

In a preferred embodiment the projections in each of the upper coupling edge flaps snap into the vertical holes in the lower coupling edge flaps and are removable therefrom.

In drawings which illustrate the embodiments of the invention,

FIG. 2 is an isometric view of a mat module according to one embodiment of the present invention.

FIG. 3 is a partial plan view of the mat module shown in FIG. 2.

FIG. 4 is a cross sectional view taken at line 4—4 of FIG. 3.

FIG. 5 is a cross sectional view taken at line 5—5 of FIG. 3.

FIG. 6 is an isometric view of a ramp strip according to one embodiment of the invention.

FIG. 7 is an end view of the ramp strip shown in FIG. 6.

Figure 1:
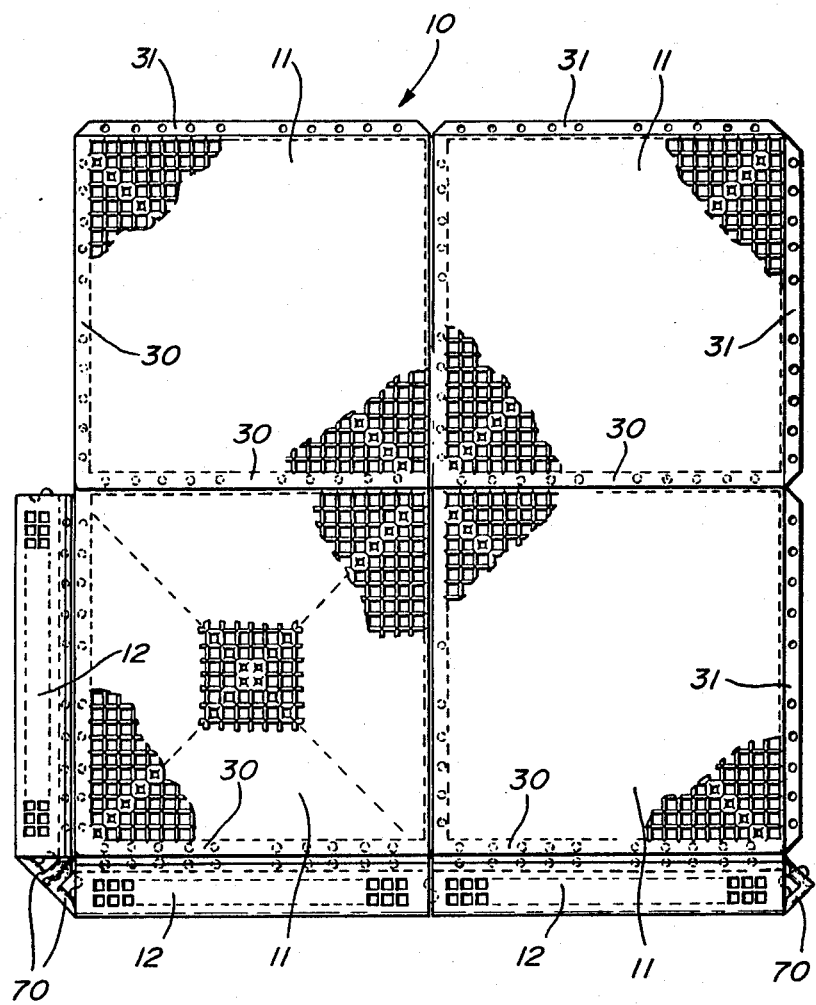
FIG. 1 is a plan view of a floor mat assembly showing a number of mat modules and ramp strips.

Referring now to the drawings, FIG. 1 shows a mat assembly 10 comprising four mat modules 11 with ramp strips 12 shown coupled around a corner of a mat module 11 and two ramp strips 12 side by side in a straight line.

The mat module 10 is shown in more detail in FIGS. 2–5. Each mat module 10 is substantially rectangular or square in shape and has a grid pattern of intersecting members 15 which intersect at nodes 16 forming vertical square holes 17 between the members 15. This grid pattern allows liquid to pass through the mat module 11 and each node 16 has on the bottom surface of the mat module a recess or space 18 which permits liquid to flow under the mat. The members 15 support the mat module 11 on the floor or ground, and the spaces 18 permit drainage beneath the mat module 11 and from one module to another. The spaces 18 are illustrated in FIG. 4. In one embodiment, as illustrated in FIG. 2, thicker members 20 are provided in diagonals 21 of the mat module 11 and show up as a decorative feature in the grid pattern. These thicker members 20 also give additional strength to the mat module 11.

Two adjoining edges of the mat module 11 have upper coupling edge flaps 30 and the two other edges or opposing edges have lower coupling edge flaps 31. The upper coupling edge flaps 30 have a top surface level with the grid pattern of members 15, and a thickness of approximately one-third of the thickness of the mat module 11. Beneath the upper flap 30 is a row of projections 32 which extend for the length of the upper flap 30. As illustrated in the drawings, five projections 32 are spaced in one half of the length of the upper flap 30 and a similar row of five projections 32 are spaced in the other half of the upper flap 30. This allows the mat modules 11 when joined or coupled together, to be coupled such that the edges of the mat modules 11 are in line or staggered so that the joins between mat modules occur at the middle of the upper flaps 30 in adjacent mat modules 11. The projections 32 have a barrel shape with the largest diameter 33 at the approximate center of the projection 32 and tapering upwards and downwards from this center diameter 33. This shape provides a snap coupling with a mating hole.

The lower coupling edge flaps 31 have a row of vertical holes 40 to mate with the row of projections 32 on the upper coupling edge flaps 30. The lower flap 31 is at a lower elevation than the upper flap 30, such that when the upper flap 30 and the lower flap 31 are coupled together, the upper flap 30 has a top surface level with the top of the mat module 11. The thickness of the lower flap 31 is substantially the same as the upper flap 30. As illustrated in more detail in FIG. 5 each hole 40 has a tubular portion 41 beneath the lower flap 31 extending down to the bottom surface of the mat module 11. The hole 40 has smaller diameter 42 at the top, smaller than the center diameter 33 of the projection 32, so that when the projection 32 is inserted into the hole 40 the center diameter 33 of the projection 32 is positioned below the smaller diameter 42, and remains in place in the hole until pulled out.

The ramp strip 12 as illustrated in FIGS. 6 and 7 has a sloped or tapered face 60 extending down from the surface of the mat 11 at an angle to form a ramp to the ground or floor. Two rows of square holes 61 are located in the tapered face 60, these holes 61 are substantially the same size as the holes 17 in the mat module, and the pattern matches the grid pattern in the mat module 11, with intersecting members 62 having substantially the same width as the intersecting members 15 in the mat module 11. An upper coupling edge flap 63 is located adjacent the tapered face 60 and has a series of projections 64 on the underneath side of the flap 63 similar to the projections 32 on the mat module 11, designed to couple with a lower flap 31 of a mat module 11. A severable connecting link 65 joins the upper flap 63 to a lower coupling edge flap 66. The lower flap 66 is positioned outside the upper flap 63, such that when the ramp strip 12 is coupled to an upper flap 30 of a mat module 11, the top surface of the upper flap 30 is in line with the top surface of the upper flap 63 of the ramp strip 12. A series of holes 67 having tubular portions 68 underneath extending down to the bottom surface of the ramp strip 12, are arranged to couple with projections 32 in an upper flap 30 of a mat module 11. Thus, it can be seen that the ramp strip 12 can either be used to couple the lower flap 66 of the ramp strip 12 with an upper flap 30 of a mat module 11 or, alternatively, by severing the connecting link 66 of the ramp strip 12 and throwing the lower flap 66 away, the upper flap 63 of the ramp strip 12 couples with a lower flap 31 of a mat module 11. Thus, this ramp strip 12 is completely flexible and can be attached to any side of a mat module 11.

At each end of the ramp strip 12 is a triangular shaped corner element 70. These elements 70 are joined to the ends of the ramp strip 12 by means of a severable connection 71. In the embodiment shown, this connection 71 is a V-groove in the material allowing the corner element 70 to be cut off by means of a razorblade or the like. A male and female dowel arrangement 72 on the outside edge of the triangular shaped corner element 70 join together when two ramp strips are positioned in a corner relationship of a mat module 11 as illustrated in FIG. 1 to ensure the surfaces of the ramp strips 12 are in line. The two triangular shaped corner elements 70 form a ramp at the corner of a mat module 11 between the two adjacent ramp elements 12. When the triangular shaped corner elements 70 are removed from the ramp strip 12 by cutting the severable connection 71, then the ramp strips may be joined together side by side in a straight line, both connected to edges of adjoining mat modules 11 with another male and female dowel arrangement 73 to ensure the surfaces of the ramp strips 12 remain on the same level and one does not rise above the other. An example of the two side by side in line ramp strips 12 is also illustrated in FIG. 1.

To assemble a mat comprising mat modules 11 and ramp strips 12, it is merely necessary to lay out the mat modules in the desired pattern and then cut the severable connecting links 65 between the upper flaps 63 and the lower flaps 66 as desired, and similarly cut the severable connections 71 to the triangular shape corner elements 70 as desired.

The mat components are formed of resilient material, preferably PVC. The grid pattern allows the mat moldules to hug a floor and give maximum gripping action on both surfaces of the mat assembly. The resilient material results in the surface having a cushioning affect for comfortable walking. The resilient material preferably contains UV stabilizers and fungus inhibitors to help fight bacteria. Furthermore, the PVC material is impervious to most chemicals, oils and greases. The material is not susceptible to mold or mildew formations and furthermore does not support combustion, and is therefore fire resistant. The mat modules and ramp strips may be molded in a number of different colours. By ensuring that the ramp extends around corners, then no gaping holes or voids appear at corners of the mat assembly and there is a smooth access to the mat for both pedestrians and rolling equipment from all directions.

Various changes may be made to the scope of the present invention, which is limited only by the following claims.

The embodiments of the invention is which an exclusive property or privilege is claimed are defined as follows:

1. A floor mat assembly formed from two different components, mat modules and ramp strips, and molded from resilient plastic and having in combination at least one mat module which is coupled to at least one ramp strip the mat module comprising a rectangular shape with two adjoining edges, each of the edges having an upper coupling edge flap with a row of downward directed projections, and two other adjoining edges, each of the other edges having a lower coupling edge flap with a row of vertical holes to couple with a row of projections on an upper coupling edge flap of a ramp strip or an adjoining mat module, the ramp strip comprising a tapered face with an upper coupling edge flap adjacent the tapered face, and a lower coupling edge flap joined by a severable link to the upper coupling edge flap, the lower coupling edge flap of the ramp strip to couple with an upper coupling edge flap of a mat module, and when the link is severed, the upper coupling edge flap of the ramp strip to couple with a lower coupling edge flap of a mat module.

2. The floor mat assembly according to claim 1, wherein the ramp strip has a severable triangular shaped corner element at each end, the triangular shaped corner element being severed for ramp strips positioned side by side in a straight line and joining with a triangular shaped corner element of an adjoining ramp strip positioned in a corner relationship such that a ramp is formed at a corner of a mat module.

3. The floor mat assembly according to claim 1 wherein the mat module has a grid pattern of intersecting members, the members intersecting at nodes forming holes through the mat module between the members, the nodes each having a space on the bottom surface of the modular mat to permit drainage.

4. The floor mat assembly according to claim 3 wherein the members intersect perpendicularly and the holes are square.

5. The floor mat assembly according to claim 3 wherein the ramp strip has a grid pattern of intersecting members with square holes therebetween having substantially the same dimensions as those in the mat member.

6. The floor mat assembly according to claim 1 wherein the projections in each of the upper coupling edge flaps snap into the vertical holes in the lower coupling edge flaps and are removable therefrom.

* * * * *